(12) United States Patent
Conde

(10) Patent No.: US 6,779,297 B2
(45) Date of Patent: Aug. 24, 2004

(54) LAWN EDGING STRIP WITH IMPROVED END CONNECTORS

(75) Inventor: Clemente Conde, Waco, TX (US)

(73) Assignee: Easy Gardener Products, Ltd., Waco, TX (US)

( * ) Notice: Subject to any disclaimer, the term of this patent is extended or adjusted under 35 U.S.C. 154(b) by 0 days.

(21) Appl. No.: 10/039,633

(22) Filed: Nov. 7, 2001

(65) Prior Publication Data

US 2003/0024157 A1 Feb. 6, 2003

Related U.S. Application Data

(60) Provisional application No. 60/309,892, filed on Aug. 3, 2001.

(51) Int. Cl.[7] .............................................. A01G 1/08
(52) U.S. Cl. ............................................ 47/33; 52/102
(58) Field of Search ......................... 52/102, 62; 47/33; 404/6; A01G 1/08

(56) References Cited

U.S. PATENT DOCUMENTS

| 2,891,352 A | * | 6/1959 | Altman ...................... 47/19.1 |
|---|---|---|---|
| 3,378,949 A | | 4/1968 | Dorris |
| 3,387,786 A | | 6/1968 | Rynberk |
| 3,484,989 A | | 12/1969 | Lazinsky |
| 3,485,449 A | | 12/1969 | Wilson |
| 3,487,600 A | | 1/1970 | Greene |
| 3,525,663 A | | 8/1970 | Hale |
| 3,545,127 A | | 12/1970 | Jensen |
| 3,701,477 A | | 10/1972 | Matt et al. |
| 3,706,627 A | | 12/1972 | Arne |
| 3,788,001 A | | 1/1974 | Balfanz, Jr. |
| 3,841,022 A | | 10/1974 | Thodos |
| 3,911,187 A | | 10/1975 | Raley |
| 4,074,479 A | | 2/1978 | Krupka |
| 4,146,666 A | | 3/1979 | Houtlosser |
| 4,190,279 A | | 2/1980 | Sguazzin |
| 4,281,473 A | | 8/1981 | Emalfarb et al. |
| 4,321,769 A | | 3/1982 | Tisbo et al. |
| 4,333,979 A | | 6/1982 | Sciaraffa et al. |
| 4,397,902 A | | 8/1983 | Resch |
| 4,644,685 A | | 2/1987 | Tisbo et al. |
| 4,761,923 A | | 8/1988 | Reum et al. |
| 4,858,379 A | | 8/1989 | West |
| 4,939,865 A | | 7/1990 | Whitcomb et al. |
| 4,955,156 A | * | 9/1990 | Williams ........................ 47/32 |
| 4,965,097 A | | 10/1990 | Bach |
| 5,020,272 A | | 6/1991 | Herrema et al. |
| 5,117,583 A | | 6/1992 | Reum |
| 5,121,569 A | | 6/1992 | Thomas |
| 5,201,154 A | | 4/1993 | Thomas |
| 5,456,045 A | * | 10/1995 | Bradley et al. ................. 47/33 |
| 5,720,128 A | * | 2/1998 | Smith et al. .................... 47/33 |
| 5,775,027 A | | 7/1998 | Tisbo et al. |
| D407,507 S | | 3/1999 | Owens, II et al. |

(List continued on next page.)

FOREIGN PATENT DOCUMENTS

| EP | 716803 A1 | * | 6/1996 | ............ A01G/1/08 |
|---|---|---|---|---|
| JP | 09107797 A | * | 4/1997 | ............ A01G/1/08 |
| JP | 200300071 A | * | 10/2000 | ............ A01G/1/08 |
| JP | 2000300071 A | * | 10/2000 | ............ A01G/1/08 |

Primary Examiner—Charles T. Jordan
Assistant Examiner—Susan C. Alimenti
(74) Attorney, Agent, or Firm—O'Keefe, Egan & Peterman, LLP

(57) ABSTRACT

A lawn edging device is provided that comprises a flexible body with a tongue connector located at one end and a pocket connector located at the other end. The pocket connector comprises a slot feature sized to receive a tongue connector of another lawn edging strip and comprises a lock feature that prevents disengagement after connection with the other lawn edging strip. The pocket connector can further comprise a guide feature to guide the tongue connector of the other lawn edging strip towards the lock feature and into engagement with the slot feature.

17 Claims, 2 Drawing Sheets

U.S. PATENT DOCUMENTS

| | | |
|---|---|---|
| 5,921,021 A | 7/1999 | Coates |
| D416,096 S | 11/1999 | Tisbo et al. |
| D416,339 S | 11/1999 | Shaw |
| D418,233 S | 12/1999 | Prassas et al. |
| 6,026,610 A * | 2/2000 | Northrop et al. .............. 47/33 |
| D426,322 S | 6/2000 | Anderson et al. |
| 6,085,458 A | 7/2000 | Gau |
| 6,138,406 A | 10/2000 | Clark, Jr. |
| D444,579 S | 7/2001 | Emalfarb |

\* cited by examiner

LAWN EDGING STRIP WITH IMPROVED END CONNECTORS

This application claims priority from Provisional Application Serial No. 60/309,892 filed on Aug. 3, 2001, which is entitled "LAWN EDGING STRIP WITH IMPROVED END CONNECTORS," the disclosure of which is being incorporated herein by reference.

TECHNICAL FIELD OF THE INVENTION

The present invention relates in general to the field of landscape edging for creating borders around gardens, flower beds, trees and other landscape features, and more particularly to a lawn edging strip with improved end connectors.

BACKGROUND OF THE INVENTION

Conventional lawn edging devices used to create borders around gardens, flower beds, trees and the like typically fall into one of two groups. One group consists generally of edging that requires a trench to be excavated along the desired layout of the edging. Examples of such edging include brick, concrete blocks, flexible plastic edging strips, and wood. Once such edging is placed in the trench, the trench is back filled along the edging. As can be appreciated, the task of trenching and back filling is a time consuming and arduous one. Furthermore, achieving a straight line across the top of the edging as well as a constant vertical alignment of the edging while back filling the trench is cumbersome and requires precise trenching and backfilling.

The second group of edging consists generally of edging that can be driven directly into the ground without trenching. Metal edging is an example of such edging. However, there are drawbacks with metal edging. It is often painted and will suffer chips and flakes over time, and it can also rust. This negatively affects the aesthetics of the edging. Also, the edges of the metal edging are typically narrow enough to pose a significant safety hazard. Children playing in the yard or people performing yard work around the edging run the risk of stepping or stumbling against the edging and being cut by the metal edges. Further, installation of metal edging can be cumbersome in that separate stakes are required that are positioned along the edging and hammered into the ground to force the edging into the ground. These separate stakes are an additional safety hazard because the top of the stake may rise above the top of the edging and pose an additional risk of snagging or cutting a person.

One conventional lawn edging device that overcomes some of the drawbacks of the above general types of edging is disclosed in U.S. Pat. No. 5,456,045, entitled "Lawn Edging Strip." This reference shows a lawn edging strip that can be inserted into the ground without the need for trenching or stakes while at the same time remaining rust free, of uniform color and safe. The lawn edging strip is structured such that it can be inserted into the ground in proper vertical alignment. It is rigid enough to withstand hammering of into the ground yet is flexible enough in a horizontal direction to allow for curving of the edging. Additionally, the disclosed edging can be shortened and still provide two ends for connecting adjacent sections of edging. Connections of these edging strips are enabled by tongue and pocket construction of its ends to allow connection of a tongue end into a pocket end in a vertical direction, or from the top. However, with regard to this edging strip, access to the pocket connector after installation can be made difficult by the flat top edge that extends over the pocket connector at the top of the edging strip. Further, the tongue connector can sometimes slide out and disengage from the pocket connector after installation.

Another conventional lawn edging device is disclosed in U.S. Pat. No. Des. 426,322, entitled "Lawn Edging With Rounded Top." This reference shows a lawn edging strip having male and female connectors at each end. In this case, the female connector does not appear to have an overlying top edge. However, the connectors are still subject to sliding and disengaging after installation.

SUMMARY OF THE INVENTION

According to the present invention, a lawn edging strip with improved end connectors is disclosed that provides significant advantages over prior lawn edging devices.

In one aspect, the lawn edging strip of the present invention comprises a flexible body. A tongue connector is located at one end of the flexible body, and a pocket connector is located at the other end of the flexible body. The pocket connector comprises a slot feature sized to receive a tongue connector of another lawn edging strip and comprises a lock feature that prevents disengagement after connection with the other lawn edging strip.

In another aspect of the present invention, the pocket connector further comprises a guide feature to guide the tongue connector of the other lawn edging strip towards the lock feature and into engagement with the slot feature.

In a further aspect, the pocket connector further comprises a flap extending from the flexible body of the lawn edging strip and a notch formed in the flap. The notch is defined by the guide feature, the lock feature and the slot feature.

In yet a further aspect of the present invention, the guide feature comprises a generally curved surface extending from a top of the notch to a midpoint of the notch. The lock feature comprises a lip positioned at an end of the guide feature that narrows the notch to a width smaller than the tongue connector. And, the slot feature is sized to match a geometry of the tongue connector.

A technical advantage of the present invention is the ability to connect two lawn edging strips in locking engagement with one another such that disengagement after installation is prevented.

Another technical advantage of the present invention is the ability to hammer a top edge of the lawn edging strip above the tongue connector while inserting it into the pocket connector of another lawn edging strip. Further, the two lawn edging strips may be engaged while one lawn edging strip has been already inserted into position in the ground.

BRIEF DESCRIPTION OF THE DRAWINGS

For a more complete understanding of the present invention, and for further details and advantages thereof, reference is now made to the following description taken in conjunction with the accompanying drawings, in which.

DETAILED DESCRIPTION OF THE INVENTION

Figure 1:
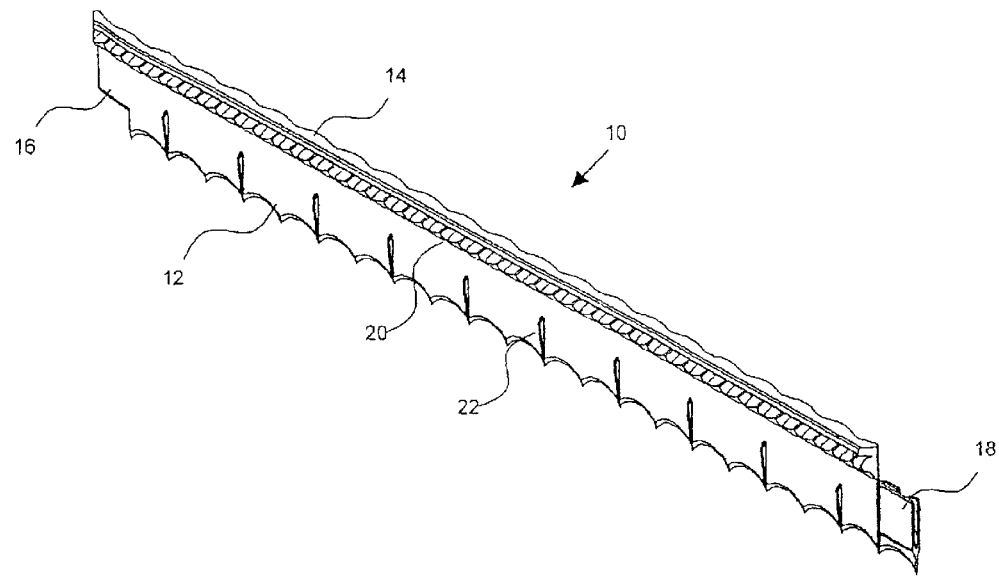
FIG. 1 is a front perspective view of one embodiment of a lawn edging strip according to the present invention.

FIG. 1 is a perspective view of one embodiment of a lawn edging strip, indicated generally at 10, according to the present invention. Lawn edging strip 10 is adapted for forced insertion into the ground to create borders around gardens, flower beds, trees and other landscape features. Lawn edging strip 10 is preferably made of a high density polyethylene or polypropylene plastic or other suitably flexible and durable material.

In this embodiment, lawn edging strip 10 has a flexible body with a bottom edge 12 that has a variable contour comprising a series of arches and points. The points facilitate initial positioning and insertion of bottom edge 12 into the ground. Furthermore, the thickness of lawn edging strip 10 has taper at bottom edge 12 to further facilitate insertion of bottom edge 12 into the ground. In other embodiments, bottom edge 12 may have alternate contours that also allow for insertion of bottom edge 12 into the ground.

In the illustrated embodiment, a top edge 14 comprises a flange extending perpendicular to lawn edging strip 10 such that top edge 14 has a generally T-shaped cross-section. As shown, the top surface of top edge 14 is flat, a first edge is scalloped, and a second edge is straight. The scalloped edge provides greater flexibility of top edge 14 to allow curving of lawn edging strip 10 prior to insertion into the ground. The top surface of top edge 14 is sufficiently wide to withstand hammering. It should be appreciated that a variety of top edge 14 configurations may be used in addition to that shown in FIG. 1.

In the embodiment of FIG. 1, lawn edging strip 10 has a first end 16 and a second end 18. An ornamental feature 20 is formed adjacent to top edge 14 and extends from first end 16 to second end 18, as shown. Ornamental feature 20 adds to the aesthetic look of lawn edging strip 10 and can be varied to achieve desired aesthetics.

Lawn edging strip 10 further includes a plurality of ribs 22. Ribs 22 are spaced generally parallel to each other, extend from bottom edge 12 of lawn edging strip 10, and are oriented generally perpendicular to the length of lawn edging strip 10. Ribs 22 are aligned with and taper toward points of bottom edge 12, as shown, to provide for support during hammering for installation. Ribs 22 may be of any appropriate length, profile and cross-section to provide sufficient rigidity and allow insertion of lawn edging strip 10 into the ground.

Figure 2:
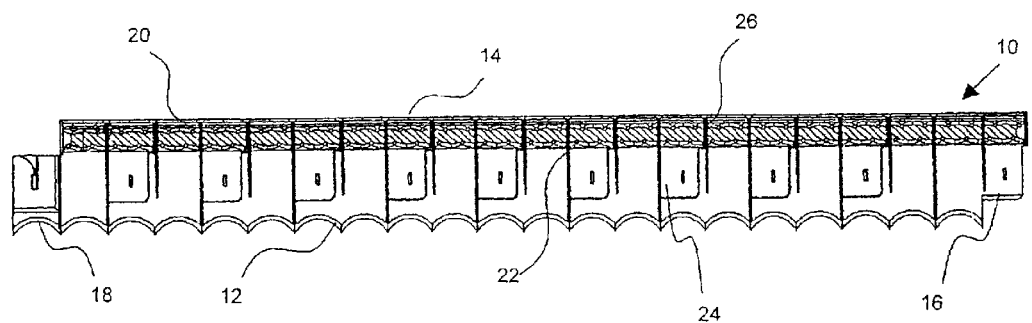
FIG. 2 is a back elevation view of one embodiment of a lawn edging strip according to the present invention.

FIG. 2 is a back elevation view of lawn edging strip 10 of FIG. 1. As shown, first end 16 and second end 18 are formed with connectors to allow end-to-end connection of multiple lawn edging strips 10. Connection is made using a tongue connector at first end 16 and a pocket connector that forms a cavity at second end 18 that can achieve locking engagement with one another. As used herein, the pocket connector may alternatively be considered a groove connector. The tongue and pocket connectors are described in more detail below. As shown, top edge 14 and ornamental feature 20 extend over the tongue connector at first end 16, but do not extend over the pocket connector at second end 18. This provides a significant advantage in allowing greater ease of access to the pocket connector once a lawn edging strip 10 has been installed in the ground.

Lawn edging strip 10 of FIG. 2 further comprises a plurality of optional ends 24 that can be used to shorten the length of lawn edging strip 10. Lawn edging strip 10 can be cut at any location 26 to shorten lawn edging strip 10 to that length. Once cut, the associated optional end 24 can provide the same connecting structure as first end 16, including the same tongue connector.

Figure 3:
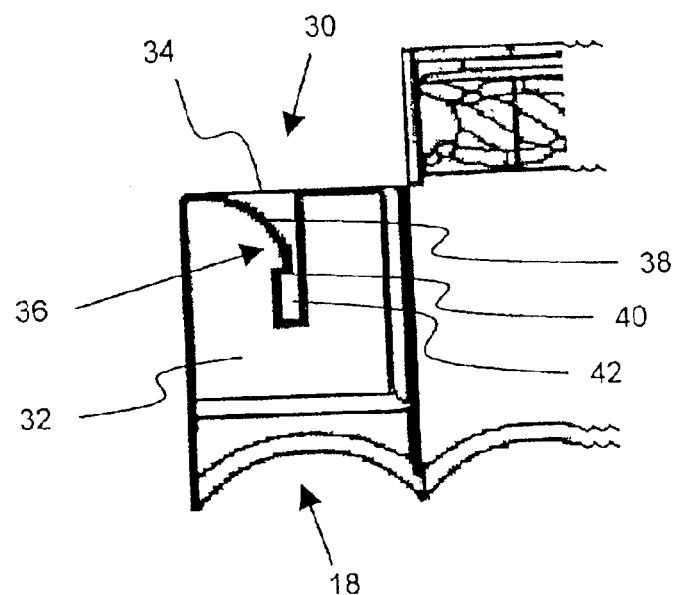
FIG. 3 is an elevation view of one embodiment of a pocket connector of the lawn edging strip according to the present invention.

FIG. 3 is 2 front elevation view of one embodiment of pocket connector 30 located at second end 18 of lawn edging strip 10. Pocket connector 30 comprises a flexible flap 32 and back surface 34 formed to receive first end 16 (or an optional end 24) of lawn edging strip 10. Pocket connector 30 further comprises a notch 36 formed in flap 32.

Notch 36 is defined by a guide feature 38, a lock feature 40 and a slot feature 42. In the embodiment of FIG. 3, guide feature 38 comprises a generally curved surface extending from near a midpoint of flap 32 to the top of flap 32, as shown. It should be understood that guide feature 38 could be varied to other shapes that similarly would provide an opening at the top of flap 32 that narrows downward towards the bottom of flap 32. Guide feature 38 ends at lock feature 40. In FIG. 3, lock feature 40 comprises a lip that narrows notch 36 to a width less than the width of the tongue connector to be received by notch 36. Slot feature 42 is positioned below lock feature 40 and is sized to receive the tongue connector located on first end 16 (or an optional end 24). In FIG. 3, slot feature 42 comprises a generally rectangular hole in flap 32, although other variations could be used as appropriate for different tongue connectors.

Figure 4:
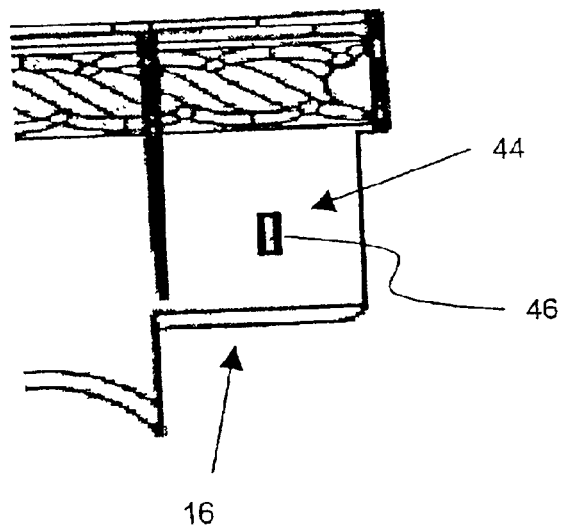
FIG. 4 is an elevation view of one embodiment of a tongue connector of the lawn edging strip according to the present invention.

FIG. 4 is a front elevation view of one embodiment of tongue connector 44 located at first end 16 (and at optional ends 24) of lawn edging strip 10. As shown, tongue connector 44 comprises a protrusion 46 sized and positioned to be received by slot feature 42 of pocket connector 30 when two lawn edging strips 10 are connected. In this embodiment, protrusion 46 is generally rectangular, but other shapes could work as well.

Together, pocket connector 30 and tongue connector 44 allow lawn edging strips 10 to be connected end-to-end to create a lawn edging assembly as long as desired. To connect pocket connector 30 of FIG. 3 with tongue connector 44 of FIG. 4, first end 16 (or optional end 24) is positioned between flap 32 and back surface 34 of pocket connector 30. Protrusion 46 is then inserted into notch 36 using guiding surface 38 to direct protrusion 46 towards lip 40 and slot 42. Lip 40 narrows notch 36, and force is used to move protrusion 46 past lip 40 and into slot 42. Insertion may also be achieved by flexing the sides of notch 36 out of the way. Once protrusion 46 has been received into slot 42, lip 40 operates to prevent protrusion 46 from easily disengaging. The result is that first end 16 (or optional end 24) and second end 18 are in locking engagement with one another, and disengagement after installation in the ground is prevented. This locking mechanism provides another significant advantage over conventional lawn edging strips that may slide apart and disengage after installation. In this manner the disengagement of two flexible strips may be hindered. It will be recognized that the lip will help prevent disengagement of two engaged edging strips. However, because the lock feature is formed of a flexible structure, two engaged edging strips may be disengaged by flexing the sides of notch 36 out of the waxy to release protrusion 46. Thus, as used herein engaged or locked does not require a permanent engagement or locking.

To install a plurality of lawn edging strips 10, a desired layout of the edging can first be planned so it can be determined if any strips need to be shortened to make the desired layout. The first lawn edging strip installed should be the one that will not need a connection to its tongue connector end. Then, the lawn edging strips can be connected and inserted into the ground one at a time by connecting the tongue connector of the next lawn edging strip into the pocket connector of the previously installed lawn edging strip. This is repeated until the layout is complete. For each lawn edging strip, the top surface can be hammered along its length to work the lawn edging strip into the ground.

Thus, a first lawn edging strip may be already inserted into the ground and then a second lawn edging strip may be engaged with the first strip. Engagement in this manner is allowed to occur because the top edge 14 and ornamental feature 20 do not extend over the pocket connector 30 of the second end 18. Because of this arrangement, the first end 16 (which has the tongue connector 44) may be inserted straight down to engage with a second end 18 of an edging strip that is already inserted in the ground. A continuous looking top edge and ornamental feature is still formed between the two adjacent edging strips, however, because the top edge 14 and ornamental design 20 extend over the tongue connector 44 at the first end 16.

Although the present invention has been described with respect to a preferred embodiment, various changes, substitutions and modifications of this invention may be suggested to one skilled in the art, and it is intended that the present invention encompass such changes, substitutions and modifications as fall within the scope of the appended claims.

What is claimed is:

1. A lawn edging strip adapted for insertion into the ground, comprising:
   a flexible body;
   a tongue connector located proximate a first end of the flexible body; and
   a pocket connector located proximate a second end of the flexible body, the pocket connector comprising a lock feature and a slot feature, the lock feature being a region of the pocket connector that is sized smaller than the slot feature and being movable such that a tongue connector of another lawn edging may move the lock feature;
   the slot feature sized to receive a the tongue connector of another lawn edging strip, and
   the size and shape of the lock feature of the pocket connector being configured to engage the tongue connector and to prevent disengagement in a vertical direction after connection with the other lawn edging strip such that disengaging the lawn edging strip from the other lawn edging strip is hindered in a vertical direction as compared to the force necessary to engage the lawn edging strip with the other lawn edging strip.

2. The lawn edging strip of claim 1, wherein the pocket connector further comprises a guide feature to guide the tongue connector of another lawn edging strip towards the lock feature and into engagement with the slot feature.

3. The lawn edging strip of claim 2, wherein the pocket connector further comprises:
   a flap extending from the flexible body of the lawn edging strip; and
   a notch formed in the flap, the notch defined by the guide feature, the lock feature and the slot feature.

4. The lawn edging strip of claim 3, wherein:
   the guide feature comprises a generally curved surface extending from a top of the notch to a midpoint of the notch;
   the lock feature comprises a lip positioned at an end of the guide feature and narrowing the notch to a width smaller than the tongue connector; and
   the slot feature is sized to match a geometry of the tongue connector.

5. The lawn edging strip of claim 4, wherein the tongue connector comprises a generally rectangular protrusion, and the slot feature comprises a generally rectangular opening for receiving the protrusion.

6. The lawn edging strip of claim 1, wherein the lawn edging strip further comprises:
   an optional end located between the first end and the second end; and
   a second tongue connector located proximate to the optional end;
   wherein the lawn edging strip can be shortened to the optional end and still be connected to another lawn edging strip, such that disengaging the lawn edging strip from the other lawn edging strip is still hindered in a vertical direction as compared to the force necessary to engage the lawn edging strip with the other lawn edging strip when using the optional end.

7. The lawn edging strip of claim 1, wherein the tongue connector and the pocket connector are oriented such that the tongue connector can be inserted into the pocket connector in a direction perpendicular to a length of the lawn edging strip.

8. The lawn edging strip of claim 1, wherein the flexible body further comprises:
   a bottom edge configured to allow forced insertion of the bottom edge into the ground; and
   a top edge configured to withstand hammering to provide force for insertion.

9. The lawn edging strip of claim 8, wherein the top edge extends over the tongue connector and does not extend over the pocket connector.

10. A method of providing a lawn edging strip such that two of the lawn edging strips may be engaged to form a longer continuous lawn edging structure, comprising:
    providing a flexible body;
    forming a tongue connector at a first end of the flexible body;
    forming a pocket connector at a second end of the flexible body, wherein the tongue connector and the pocket connector are configured to engage one another when two of the flexible bodies are placed end to end for engagement;
    configuring the first end and second end in a manner such that one of the flexible body may be engaged with another similar flexible body in a manner such that the one flexible body may be inserted into the ground prior to the another flexible body engaging the one flexible body; and
    providing a locking mechanism on the pocket connector, the locking mechanism hindering the disengagement of two engaged flexible bodies in a vertical direction such that disengaging the two engaged flexible bodies is hindered in a vertical direction as compared to the force necessary to engage the lawn edging strip with the other lawn edging strip, the locking mechanism being a region of the pocket connector that is sized smaller than a slot feature of the pocket connector and being movable such that a tongue connector of another lawn edging may move the locking mechanism.

11. The method of claim 10, wherein the pocket connector comprises a cavity for receiving the tongue connector.

12. The method of claim 10, wherein the pocket connector further comprises a guide.

13. The method of claim 12, wherein the locking mechanism comprises a lip sized to engage a protrusion of the tongue connector.

14. The method of claim 10 wherein at least a portion of the first end of the flexible body extends over the tongue connector so that when two of the flexible bodies are placed end to end for engagement a continuous structural appearance is formed between the two flexible bodies.

15. The method of claim 14 wherein the at least a portion of the first end comprises a top of the flexible body.

16. The method of claim 14 wherein the at least a portion of the first end comprises an ornamental feature of the flexible body.

17. The method of claim 10 wherein at least one optional second end location is provided within the flexible body to selectively form the second end at a varying distance from the first end wherein disengaging the lawn edging strip from the other lawn edging strip is still hindered in a vertical direction as compared to the force necessary to engage the lawn edging strip with the other lawn edging strip when using the optional second end location.

* * * * *

UNITED STATES PATENT AND TRADEMARK OFFICE
CERTIFICATE OF CORRECTION

PATENT NO. : 6,779,297 B2
DATED : August 24, 2004
INVENTOR(S) : Clemente Conde

It is certified that error appears in the above-identified patent and that said Letters Patent is hereby corrected as shown below:

Column 5,
Line 39, please change "receive a the tongue" to -- receive the tongue --.

Signed and Sealed this

Seventh Day of December, 2004

JON W. DUDAS
*Director of the United States Patent and Trademark Office*